United States Patent [19]
Cheng

[11] Patent Number: 5,157,381
[45] Date of Patent: Oct. 20, 1992

[54] COMPUTER MOUSE

[76] Inventor: San-Yih Cheng, 4 Lane 83 Guei-Suei Street, Taipei, Taiwan

[21] Appl. No.: 512,205
[22] Filed: Apr. 20, 1990
[51] Int. Cl.$^5$ ............................................. G09G 3/02
[52] U.S. Cl. ...................... 340/710; 340/706; 340/709; D14/114; 74/471 XY; 273/148 B
[58] Field of Search ................ 340/710, 709, 706; D14/114, 115, 116; 273/148 B; 400/492, 494, 489; 341/22; 382/59; 74/471 XY; 200/6 A

[56]  References Cited

U.S. PATENT DOCUMENTS

| | | | |
|---|---|---|---|
| D. 313,981 | 1/1991 | Yang | D14/114 |
| D. 314,194 | 1/1991 | Norris | D14/114 |
| 4,024,368 | 5/1977 | Shattuck . | |
| 4,256,931 | 3/1981 | Palisek | 200/6 A |
| 4,550,316 | 10/1985 | Whetstone et al. | 340/710 |
| 4,581,761 | 4/1986 | Ichinokawa et al. | 340/710 |
| 4,738,417 | 4/1988 | Wenger | 74/471 XY |
| 4,804,949 | 2/1989 | Faulkerson . | |
| 4,862,165 | 8/1989 | Gart | 340/710 |

FOREIGN PATENT DOCUMENTS

| | | | |
|---|---|---|---|
| 2041295 | 9/1980 | United Kingdom | 400/489 |
| 2161755 | 1/1986 | United Kingdom . | |

Primary Examiner—Jeffery A. Brier
Assistant Examiner—Regina Liang
Attorney, Agent, or Firm—Michael J. Lennon

[57]  ABSTRACT

A computer mouse has a unique push-button configuration which enhances button assignment flexibility while remaining user friendly. Three buttons are provided with a middle button having a smaller but raised surface area when compared to the other two buttons.

15 Claims, 2 Drawing Sheets

COMPUTER MOUSE

BACKGROUND OF THE INVENTION

1. Field of The Invention

The present invention relates to a new computer mouse, a popular computer peripheral.

In particular, the present invention is directed to a new computer mouse which includes the button assignment flexibility of a three button computer mouse while having a button configuration having the ease of use of a two button mouse which is more user friendly than a three button mouse in that the configuration is ergonomic because it provides for physically comfortable and effective operation by a user.

2. Related Art

A computer mouse is a well known computer peripheral device. The mouse has a great number of uses such as in the computer aided design area. Typically, the mouse is utilized by a computer user to point to regions or locations on a computer screen so as, for example, to select information which is represented on the display screen, or to designate locations on a display screen at which certain drawings or designs are to appear. The possible uses of a computer mouse are well known in relationship to its pointing and selection capabilities.

There are many designs available for such computer mouses or mice. Among the most popular designs are two button computer mice and three button computer mice.

The two button computer mouse is a simple design in which the two buttons are provided on the front edge of the mouse so that the user's index and middle finger can easily be disposed atop the two buttons. With this design the user has the capability of operating both buttons in a comfortable manner. However, due to the use of only two buttons, the mouse has a limit of 2×2 or four possible button assignments. Therefore, while the two button mouse is user friendly in that it can be used comfortably, it has a limitation as far as its field of use in connection with certain computer programs in which a greater number of button assignments are used to carry out additional functions.

In order to enhance the flexibility of the computer mouse, there has been an improvement suggested for the mouse in which three buttons are provided along the front edge of the mouse. This three button design is shown in FIG. 1(b), standing alone. It can be seen that the three buttons 10, 11 and 12 are provided in a parallel fashion at a front edge of the computer mouse. The three buttons are of approximately equal size and are evenly distributed across the front edge of the mouse.

FIG. 1(a) illustrates a user configuration in which the user utilizes the index finger, middle finger and ring finger in order to control the selection of these three buttons. While this configuration provides greater flexibility for button assignment, mainly i.e. button assignments can be made for a three button mouse, it is more uncomfortable to use than the two button computer mouse described above. In particular, since the middle button of the three button design is typically of the least used, the placement of the three fingers to actuate the three buttons in the manner shown in FIG. 1(a) lends itself to accidental actuation of the middle button, thus unintentionally designating a specific button arrangement. In order to avoid this problem, many users only utilize two fingers rather than three fingers in order to operate the three button mouse. In those instances, the user makes use of the index and middle finger to operate the three buttons. Generally, this requires a spread of these two fingers around the middle, little used button, to utilize the most extreme of the two buttons. When a user elects such a finger positioning scheme, the spread of the index and middle finger is at a large angle that results in fatigue with long hours of operation.

Thus, the known two and three button computer mouse designs have different disadvantages. The ergonomic two button mouse lacks the button assignment flexibility of the three button mouse, while the more flexible three button mouse is less ergonomic and more unfriendly to the user for long hours of operation.

SUMMARY OF THE INVENTION

The present invention utilizes the advantages of both the two button computer mouse and the three button computer mouse while eliminating their disadvantages. In particular, the present invention provides a new button configuration on a mouse. The mouse has three selectable switches which maybe switch buttons along a front area or region of the mouse. However, the middle button, which is the least used button, is designed with a different shape and configuration than the two outside buttons which are utilized most frequently. In the design of the present invention the middle button is smaller in area than either the two outside buttons, left or the right button. In addition, the middle button has a projected surface level that is raised above the surface level of the left and the right buttons.

In one embodiment of the present invention, the middle button is partially surrounded by the front opposing sides of the left and the right buttons. In a second embodiment of the present invention, the middle button is arranged so as to be substantially parallel to the right and left button. In both embodiments, the middle button configuration permits a user to utilize the middle and index fingers in order to control the three buttons.

Each of the switches has a parallel length. In one embodiment the length of the outside switches exceeds that of the inside switches. As a result in this embodiment the outside switches are adjacent to one another in a region away from a front portion of the mouse.

In the computer mouse of the present invention, the outside switches can have shapes that are the mirror image of one another. Additionally, the middle switch, which acts as a separation, can have a triangular shape.

The user can maintain contact with the left and right buttons with the index and middle fingers, as in the typical two button mouse design, without the fatigue which normally results from a typical three button mouse design as a consequence of the reduced size and improved layout of the middle button of the mouse of the present invention. This "2.5 button" mouse design provides improved ergonomics and button assignment flexibility.

DETAILED DESCRIPTION OF THE PRESENT INVENTION

Figure 1A:
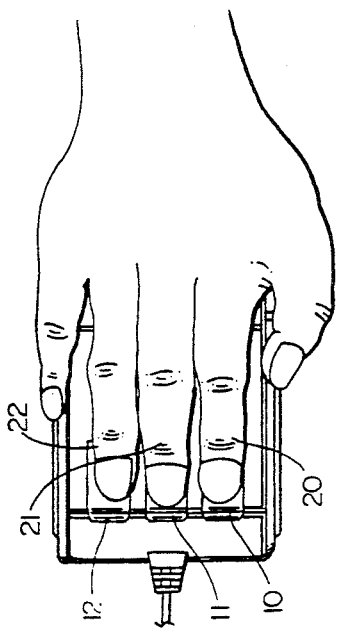
FIG. 1(a) and (b) illustrate typical three button mouse design and the suggested operational configuration for that typical mouse design.
Figure 1B:
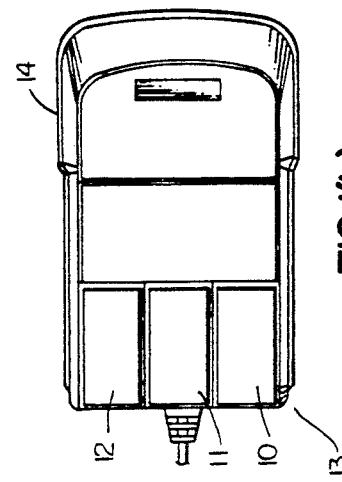

As described above, FIGS. 1(a) and (b) illustrate a conventional three button computer and a user configuration for utilizing such a mouse. The mouse shown standing alone in FIG. 1(b) has three buttons, 10, 11 and 12 along a front edge 13 of the device. The outside buttons 10 and 12 are the most frequently used buttons while middle button is used less frequently than either buttons 10 and 12. In FIG. 1(a), the three button mouse is shown with a typical user configuration. In particular, the fingers of the user's hand are contact with the buttons on the mouse such that index finger 20 contacts button 10, middle finger 21 contacts button 11 and ring finger 22 contacts button 12.

Figure 2:
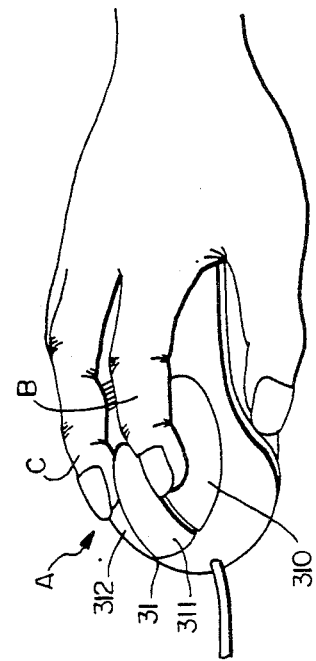
FIG. 2 illustrates a perspective view of a computer mouse according to a first embodiment of the present invention.

FIG. 2 illustrates a computer mouse in accordance with a first embodiment of the present invention. The mouse has a button area 31 along a front portion A of the mouse. The button area 31 includes three buttons, 310, 311 and 312. The middle button, 311 is, as described above, the least used button in a three button mouse design. In accordance with the present invention, the middle button 311 is smaller in surface area than either of the side buttons 310 and 312. In the illustration of FIG. 2, middle button 311 has a triangular-like surface area and is disposed between buttons 310 and 312. Unlike buttons 310 and 312, button 311 does not extend completely along the button area 31. That is, buttons 310 and 312 extend from a front area $A_1$ of the button area 31 to the extreme back region $B_1$ of the button area 31 along the top of the mouse thereby defining a maximum button length. Button 311 extends only from the front area of the mouse up to a point less than the maximum button length. As a result, buttons 312 and 310 extend around a top portion of button 311 and oppose one another in region 313. Button 311 also is disposed in such a manner that the surface area of button 311 is projected above the respective surface areas of buttons 310 and 312. The lateral buttons 310 and 312 have surface areas disposed approximately level to one another. Thus, button 311 appears raised as opposed to buttons 310 and 312, in addition to being smaller than those two buttons.

Figure 3:
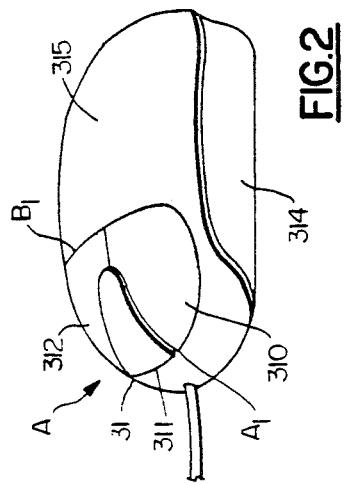
FIGS. 3 and 4 illustrate operational configurations utilizing the embodiment of FIG. 2.
Figure 4:
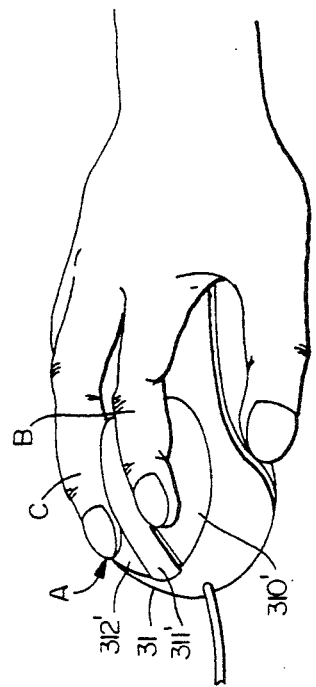

The operational uses of this three button design are illustrated in FIGS. 3 and 4. In this configuration, when the user desires to operate the left 311 and right 312 buttons, the user can utilize the index finger and middle finger and can click or select the corresponding button with ease as in the same manner as if using a two button mouse. The user's fingers extend comfortably along either side of the raised middle button 311 without necessarily contacting that button. Thus, there is no unnecessary or unnatural spread of the two fingers required for operation of the right and left buttons, the most frequently used buttons. The user can utilize the computer mouse for long hours without unnecessary fatigue.

When it is necessary to click or select the middle button 311, the user can easily move either the index finger or middle finger to the raised middle button 311 and select it. Thus, its location between the two buttons makes for easy selection and its raised nature permits it to act as a separator between the right and left buttons and also prevents accidental activation of the middle button thereby enhancing the likelihood or proper selection of a desired button assignment. However, since the surface area of the middle button 311 is smaller than the area of the right and left buttons, this separation does not cause an unnatural spread of the fingers and thus renders a more user friendly or ergonomic design.

Figure 5:
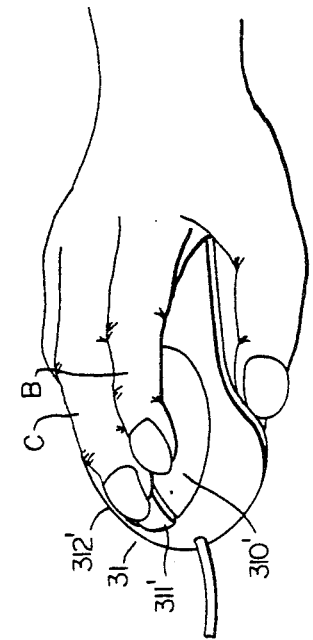
FIG. 5 illustrates a perspective view of a computer mouse according to a second embodiment of the present invention.

FIG. 5 illustrates a second embodiment of the computer mouse of the present invention. In this embodiment the three buttons are again arranged in a button area 31 along a front end of the mouse A. However, in this design, the middle button 311' has a different shape than 311 of FIG. 2. In particular, 311' is substantially parallel with buttons 310' and 312'. All three buttons extend from a first region $A_1$ of the button area 31 to a back region $B_1$ of the button area 31. In this configuration, the buttons 312' and 310' do not surround button 311' and do not directly oppose each other. However, as in the embodiment of FIGS. 2 to 4, the middle button, 311' is much smaller in surface area than button 310' or button 312'. Also, the surface level of button 311' is projected above or raised above the surface level of buttons 310' and 312'. Thus the user can utilize this computer mouse in the manner shown in FIGS. 6 and 7. These drawing figures are somewhat similar to FIGS. 3 and 4.

Figure 6:
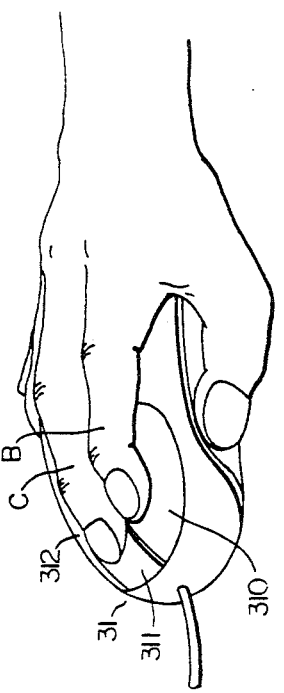
FIGS. 6 and 7 operational configurations utilizing the second embodiment of the present invention.

In particular in FIG. 6, the user may make use of the index and middle finger to operate the side buttons, 310' and 312'. The middle button 311' acts as a separator between the index finger and middle finger in this operation. The raised nature of the middle button reduces the likelihood of misdesignation of a desired button assignment. In addition, the narrower width of the middle button 311' permits the user to maintain a separation of index and middle fingers which is comfortable and which does not promote early fatigue. Thus, in this configuration, the user makes use of the mouse in much the same manner as a two button mouse.

Figure 7:
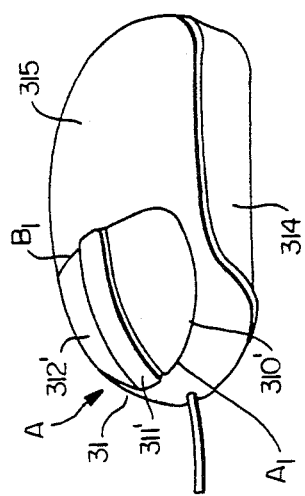

However, when the mouse is utilized as illustrated in FIG. 7, the middle button provides the additional button assignment capabilities which are typically associated with the three button mouse. The user may select to use either the index finger or the middle finger in order to activate the middle button 311'.

The second embodiment of the present invention provides the same advantages of the first, namely the separator function as well as the ergonomic comfort to the user together with the flexibility and versatility of additional button assignments. The design differs in the construction of the middle button as described above.

Both embodiments include a recessed side curvature construction, designated as region 314 in both FIGS. 2 and 5. This side curvature region enhances the ergonomics of the mouse of the present invention. In particular, the user's thumb fits comfortably into this side recessed curvature region while the top back portion 315 of the mouse supports the remainder of the fingers and the top palm portion of the hand. The contour thus better matches a comfortable hand resting position with respect to the mouse.

Other middle button configurations are also possible which can carry out this present invention. In particular, other button configurations in which the surface area of the middle button is reduced as compared to the surface area of the side buttons and the surface level of the middle button is different than that of the two side buttons. In these instances the reduction in size of the middle button allows the user to operate the computer mouse with only two fingers with a reduced amount of finger spread thereby enhancing the ergonomic characteristics of the mouse while maintaining the versatility of a typical three button mouse design. This "2.5 button" mouse design can use the same operation software as a typical three button mouse, such as the Setup Software for the New Idea Mouse, a multimode mouse by New Idea Electronic Co., Ltd. of Taipei, Taiwan. Thus, it is easily compatible with systems for which a three button is usable without the need of special software.

What is claimed is:

1. A peripheral device for use with a computer to enable a user to interact with information displayed on a display device associated with the computer, comprising:
   a first region;
   a first selectable switch having a first shape defining a first surface area;
   a second selectable switch having a second shape defining a second surface area and being disposed adjacent to said first selectable switch; and
   a third selectable switch having a third shape defining a third surface area and being disposed adjacent to said second selectable switch;
   wherein said first, second and third selectable switches are disposed in said first region and are electronically unique and independent;
   wherein said first and said third surface areas are substantially equal and have a first surface level and said second surface area is substantially less than said first and third surface areas and has a second surface level projected above said first surface level, whereby said second selectable switch acts as a separate between said first and third selectable switches;
   wherein said first and third selectable switches have a parallel length, extending from a first end of said device toward a second end of said device, longer than a parallel length of said second selectable switch whereby in a second region, adjacent said first region and disposed between said first region and said second end of said device, said first and third selectable switches are adjacent one another and partially surround said second selectable switch.

2. The peripheral device of claim 1 wherein said second shape is substantially triangular.

3. A peripheral device for use with a computer to enable a user to interact with information displayed on a display device associated with the computer, comprising:
   a first region;
   a first push-button switch having a first shape defining a first surface area;
   a second push-button switch having a second shape defining a second surface area and being disposed adjacent to said first push-button switch;
   a third push-button switch having a third shape defining a third surface area and being disposed adjacent to said second push-button switch;
   wherein said first, second and third push-button switches are disposed in said first region and are electronically unique and independent;
   wherein said first and third surface areas are substantially equal and have a first surface level and said second surface area is substantially less than said first and said third surface areas and has a second surface level projected above said first surface level, whereby said second push-button switch is a separator between said first and third push-button switches and a user can comfortably operate said first, second and third push-button switches with only two fingers;
   wherein said first and third push-button switches have a parallel length, extending from a first end of said device toward a second end of said device, longer than a parallel length of said second push-button switch whereby in a second region, adjacent said first region and disposed between said first region and said second end of said device, said first and third push-button switches are adjacent one another and partially surround said second push-button switch.

4. The peripheral device of claim 3 wherein said second shape is substantially triangular.

5. A computer mouse a computer mouse having a housing and an operation region on the housing, comprising:
   a first selectable switch disposed in said operation region and having a first surface area;
   a second selectable switch disposed in said operation region and having a second surface area that is smaller than said first surface area;
   a third selectable switch, disposed in said operation region and having a third surface area, that is larger than said second surface area;
   said second selectable switch being disposed between said first and said third selectable switches and separating said first and third selectable switches in a frontal region of said operation region and having a surface level projected above a surface level of said first selectable switch and a surface level of said third selectable switch, wherein said first, second and third selectable switches are electronically unique and independent;
   wherein said first and said third selectable switches have a first maximum length extending the length of said operation region and said second selectable switch has a second maximum length, extending from said frontal region, less than said first maximum length, whereby the first and third selectable switches are directly adjacent one another in a back region of said operation region.

6. The computer mouse of claim 5 wherein said first, second and third selectable switches comprise push-button switches.

7. The computer mouse of claim 5 wherein said second push-button switch has a triangular shape.

8. The computer mouse of claim 7 wherein said first and third push-button switches are mirror images of one another.

9. A peripheral device for use with a computer to enable a user to interact with information displayed on a display device associated with the computer, comprising:
   a first region;
   a first selectable switch having a first shape defining a first surface area;
   a second selectable switch having a second shape defining a second surface area and being disposed adjacent to said first selectable switch; and
   a third selectable switch having a third shape defining a third surface area and being disposed adjacent to said second selectable switch;

wherein said first, second and third selectable switches are disposed in said first region and are electronically unique and independent;

wherein said first and said third surface areas are substantially equal and have a first surface level and said second surface area is substantially less than said first and third surface areas and has a second surface level projected above said first surface level, whereby said second selectable switch acts as a separate between said first and third selectable switches;

wherein said first, second and third selectable switches have a substantially equal parallel length extending from a first end of said device toward a second end of said device and said first and said third selectable switches have a first width substantially larger than a second width of said second selectable switch.

10. A peripheral device for use with a computer to enable a user to interact with information displayed on a display device associated with the computer, comprising:

a first region;

a first push-button switch having a first shape defining a first surface area;

a second push-button switch having a second shape defining a second surface area and being disposed adjacent to said first push-button switch;

a third push-button switch having a third shape defining a third surface area and being disposed adjacent to said second push-button switch;

wherein said first, second and third push-button switches are disposed in said first region and are electronically unique and independent;

wherein said first and third surface areas are substantially equal and have a first surface level and said second surface area is substantially less than said first and said third surface areas and has a second surface level projected above said first surface level, whereby said second push-button switch is a separator between said first and third push-button switches and a user can comfortably operate said first, second and third push-button switches with only two fingers;

wherein said first, second and third push-button switches have a substantially equal parallel length, extending from a first end of said device toward a second end of said device, and said first and said third push-button switches have a first width substantially larger than a second width of said second push-button switch.

11. A peripheral device for use with a computer to enable a user to interact with information displayed on a display device associated with the computer, comprising:

a first region;

a first selectable switch having a first shape defining a first surface area;

a second selectable switch having a second shape defining a second surface area and being disposed adjacent to said first selectable switch; and a third selectable switch having a third shape defining a third surface area and being disposed adjacent to said second selectable switch;

wherein said first, second and third selectable switches are disposed in said first region;

wherein said first and said third surface areas are substantially equal and have a first surface level and said second surface area is substantially less than said first and third surface areas and has a second surface level projected above said first surface level, whereby said second selectable switch acts as a separate between said first and third selectable switches; and wherein said first and third selectable switches have a parallel length, extending from a first end of said device toward a second end of said device, longer than a parallel length of said second selectable switch whereby in a second region, adjacent said first region and disposed between said first region and said second end of said device, said first and third selectable switches are adjacent one another and partially surround said second selectable switch.

12. A peripheral device for use with a computer to enable a user to interact with information displayed on a display device associated with the computer, comprising:

a first region;

a first selectable switch having a first shape defining a first surface area;

a second selectable switch having a second shape defining a second surface area and being disposed adjacent to said first selectable switch; and a third selectable switch having a third shape defining a third surface area and being disposed adjacent to said second selectable switch;

wherein said first, second and third selectable switches are disposed in said first region;

wherein said first and said third surface areas are substantially equal and have a first surface level and said second surface area is substantially less than said first and third surface areas and has a second surface level projected above said first surface level, whereby said second selectable switch acts as a separate between said first and third selectable switches; and wherein said first, second and third selectable switches have a substantially equal parallel length extending from a first end of said device toward a second end of said device and said first and said third selectable switches have a first width substantially larger than a second width of said second selectable switch.

13. A peripheral device for use with a computer to enable a user to interact with information displayed on a display device associated with the computer, comprising:

a first region;

a first push-button switch having a first shape defining a first surface area;

a second push-button switch having a second shape defining a second surface area and being disposed adjacent to said first push-button switch;

a third push-button switch having a third shape defining a third surface area and being disposed adjacent to said second push-button switch;

wherein said first, second and third push-button switches are disposed in said first region;

wherein said first and third surface areas are substantially equal and have a first surface level and said second surface area is substantially less than said first and said third surface areas and has a second surface level projected above said first surface level, whereby said second push-button switch is a separator between said first and third push-button switches and a user can comfortably operate said first, second and third push-button switches with only two fingers; and wherein said first and third push-button switches have a parallel length, extending from a first end of said device toward a second end of said device, said first and third push-button switches are adjacent one another and partially surround said second push-button switch.

14. A peripheral device for use with a computer to enable a user to interact with information displayed on a display device associated with the computer, comprising:

a first region;

a first push-button switch having a first shape defining a first surface area;

a second push-button switch having a second shape defining a second surface area and being disposed adjacent to said first push-button switch;

a third push-button switch having a third shape defining a third surface area and being disposed adjacent to said second push-button switch;

wherein said first, second and third push-button switches are disposed in said first region;

wherein said first and third surface areas are substantially equal and have a first surface level and said second surface area is substantially less than said first and said third surface areas and has a second surface level projected above said first surface level, whereby said second push-button switch is a separator between said first and third push-button switches and a user can comfortably operate said first, second and third push-button switches with only two fingers;

wherein said first, second and third push-button switches have a substantially equal parallel length, extending from a first end of said device toward a second end of said device, and said first and said third push-button switches have a first width substantially larger than a second width of said second push-button switch.

15. A computer mouse having a housing and an operation region on the housing, comprising:

a first selectable switch disposed in said operation region and having a first surface area;

a second selectable switch disposed in said operation region and having a second surface area that is smaller than said first surface area;

a third selectable switch, disposed in said operation region and having a third surface area, that is larger than said second surface area;

said second selectable switch being disposed between said first and said third selectable switches and separating said first and third selectable switches in a frontal region of said operation region and having a surface level projected above a surface level of said first selectable switch and a surface level of said third selectable switch;

wherein said first and said third selectable switches have a first maximum length extending the length said operation region and said second selectable switch has a second maximum length, extending from said frontal region, less than said first maximum length, whereby the first and third selectable switches are directly adjacent one another in a back region of said operation region.

* * * * *

UNITED STATES PATENT AND TRADEMARK OFFICE
CERTIFICATE OF CORRECTION

PATENT NO. : 5,157,381  
DATED : October 20, 1992  
INVENTOR(S) : San-Yih Cheng

It is certified that error appears in the above-indentified patent and that said Letters Patent is hereby corrected as shown below:

| Column | Line | |
|---|---|---|
| 1 | 57 | Change "mainly i.e." to --mainly, i.e.,--. |
| 2 | 22 | Change "which maybe" to --which may be--. |
| 2 | 27 | Change "invention the" to --invention, the--. |
| 2 | 28 | Change "buttons, left" to --buttons, the left--. |
| 2 | 42 | Change "result in" to --result, in--. |
| 3 | 4 | Change "7 operational" to --7 illustrate operational--. |

UNITED STATES PATENT AND TRADEMARK OFFICE
CERTIFICATE OF CORRECTION

PATENT NO. : 5,157,381

DATED : October 20, 1992

INVENTOR(S) : San-Yih Cheng

It is certified that error appears in the above-indentified patent and that said Letters Patent is hereby corrected as shown below:

| 3 | 15 | Change "button" to --button 11--. |
| 5 | 35 | Change "separate" to --separator--. |
| 6 | 19 | Delete "a computer mouse". |
| 7 | 10 | Change "separate" to --separator--. |
| 8 | 5 | Change "separate" to --separator--. |
| 8 | 38 | Change "separate" to --separator--. |
| 10 | 29 | Change "said" to --of said--. |

Signed and Sealed this

Twenty-sixth Day of October, 1993

Attest:

BRUCE LEHMAN

Attesting Officer

Commissioner of Patents and Trademarks